United States Patent [19]

Canevari

[11] Patent Number: 4,481,113

[45] Date of Patent: Nov. 6, 1984

[54] FILTER MEDIA AND METHOD FOR CLEANSING ENTRAINED OILS FROM OIL-IN-WATER EMULSIONS

[75] Inventor: Gerard P. Canevari, Cranford, N.J.

[73] Assignee: Exxon Research & Engineering Co., Florham Park, N.J.

[21] Appl. No.: 376,724

[22] Filed: May 10, 1982

Related U.S. Application Data

[63] Continuation-in-part of Ser. No. 251,900, Apr. 7, 1981, abandoned.

[51] Int. Cl.³ .............................................. B01J 31/02
[52] U.S. Cl. ..................................... 210/680; 210/693; 210/924; 210/502.1; 427/220; 427/314; 502/401
[58] Field of Search ....................... 252/428, 430, 426; 210/671, 680, 691, 693, 263, 502, 504, 424; 427/134, 212, 314, 220

[56] References Cited

U.S. PATENT DOCUMENTS

| | | | |
|---|---|---|---|
| 3,484,371 | 12/1969 | Biegler | 210/924 |
| 3,562,153 | 2/1971 | Tully et al. | 210/680 |
| 3,728,208 | 4/1973 | Whittington et al. | 210/680 |
| 3,729,411 | 4/1973 | Otrhaler | 210/680 |
| 3,922,392 | 11/1975 | Kohlschutter et al. | 427/215 |
| 3,923,688 | 12/1975 | Hammel | 210/924 |
| 4,017,528 | 4/1977 | Unger et al. | 252/428 |
| 4,082,660 | 4/1978 | Papirer | 210/680 |

*Primary Examiner*—John Adee
*Attorney, Agent, or Firm*—Joseph J. Dvorak

[57] ABSTRACT

Granular media are featured which cleanse oil from oil-in-water emulsions. These media comprise a glass or filter sand substrate. The substrate is treated with at least one trialkoxysilane wherein the alkoxy moiety comprises from 1 to 2 carbons. The granular media are backwashable to refresh their lipophilic properties.

22 Claims, 5 Drawing Figures

FILTER MEDIA AND METHOD FOR CLEANSING ENTRAINED OILS FROM OIL-IN-WATER EMULSIONS

CROSS REFERENCE TO RELATED APPLICATIONS

This is a continuation-in-part of application Ser. No. 251,900 filed Apr. 7, 1981, abandoned.

FIELD OF THE INVENTION

This invention pertains to granular media and methods of use in filter beds for cleansing oily water, and more particularly to granular media for clearing oil-in-water emulsions of their dispersed oil even after several backwashings.

BACKGROUND OF THE INVENTION

Heretofore, filter beds for removing dispersed oils from oil-in-water emulsions utilized a sand or anthracite granular medium to trap the oil in the interstices of the medium.

Recent reasearch, however, has shown that a more effective filtering mechanism would allow the oil to wet and adhere to the medium material in an adsorptive manner. Conventional sand or anthracite materials do not normally have adsorptive characteristics, and their ability to remove and retain oils is therefore limited.

After extensive screening of various sand and glass materials for filter bed use, a chemical treatment was developed to enhance the affinity of sand for the oils dispersed in the water. The chemical treatment consisted of treating a 16 to 20 mesh sand with a primary aliphatic amine, as illustrated in U.S. Pat. No. 3,901,818 issued Aug. 26, 1975. A filter bed of this treated sand was shown to have superior oil removal ability, but failed to retain this ability after an extended filtering run. After backwashing, this bed of aliphatic amine-treated sand did not regain its former ability to remove the entrained oils.

The present invention has developed new and improved chemically treated filter media for removing oil from oil-water emulsions, which media will regain its ability to remove the oils even after many backwashings.

The invention uses a chemical treatment which creates a siloxane bond between a lipophilic hydrocarbon and a granulated sand or glass substrate. This chemical treatment binds the lipophilic hydrocarbon to the surface of the medium where it is exposed to the flowing oil-water stream.

A similar chemical treatment is shown and described in U.S. Pat. No. 4,017,528, issued Apr. 12, 1977. The above patent teaches the creation of a siloxane-type bond in porous silicon dioxide substrates to improve their absorptive properties for chromatography purposes.

The present invention desires to improve the adsorptive properties of a silicon dioxide granulated substrate, but requries that the substrate be one which is non-porous rather than porous.

In another sense, the above treatment when applied to granular substrates for purposes of this invention, will not provide a workable filter medium. This is so, because the resulting adsorptivity of the filter bed will cause the granular particles to agglomerate. This results in a plugging or general fouling of the bed such that it will not filter properly. To correct this, it has been discovered that treated granular glass material can be mixed in substantially equal proportions with non-treated glass materials in order to provide uniform flow paths through the bed cross-section.

Also, it is contemplated that glass granules may be only partially treated with alkoxy silanes in order to provide a free flowing filter bed during backwash.

Still another procedure which has been found to provide an efficacious filter bed is to fully treat "filter sand" with an alkoxy silane. The filter sand having a less adsorptive character than the glass granules is susceptible to a full chemical treatment without producing an overly oil-wettable filter bed.

The three aforementioned procedures will provide filter media which not only have superior oil-wetting properties, but which also effectively regain their oil-wettability even after many backwashes.

BRIEF SUMMARY OF THE INVENTION

This invention relates to back-washable media and a method for cleansing oil-in-water emulsion of their dispersed oil.

Broadly stated, the filter media of the present invention comprises a non-porous substrate selected from the group consisting of granular glass which has been treated with caustic and from about 1.5 to 1.8 grams/liter of at least one trialkoxysilane, a mixture of about 50 volume percent granular glass and 50 volume percent granular glass which has been treated with caustic and from about 3 to 3.5 grams/liter of at least one trialkoxysilane, filter sand which has been treated with caustic and from about 3 to 3.5 grams/liter of at least one trialkoxysilane and a mixture of about 50 volume percent of filter sand and about 50 volume percent of said treated filter sand, said trialkoxysilane in all instances having from 1 to 2 carbon atoms in the alkoxy group.

Thus, a first media embodiment comprises a mixture of approximately 50 percent by volume of smooth-surfaced, non-porous granular glass treated with approximately 3 to 3.5 grams/liter of at least one trialkoxysilane wherein said alkoxy moiety comprises from 1 to 2 carbons; and approximately 50 percent by volume of non-treated smooth-surfaced, non-porous granular glass.

A second embodiment comprises smooth-surfaced, non-porous, granular filter sand treated with approximately 3 to 3.5 grams/liter of at least one trialkoxysilane wherein the alkoxy moiety has from 1 to 2 carbons.

A third embodiment comprises smooth-surfaced, non-porous granular glass treated with approximately 1.5 to 1.8 grams/liter of at least one trialkoxysilane, wherein said alkoxy moiety comprises from 1 to 2 carbons.

The above granular substrate may have a mesh size (U.S. Standard Sieve Size) of either approximately from 10 to 20 or from 20 to 30.

The trialkoxysilane may preferably comprise a gamma-aminopropyl triethoxysilane.

The trialkoxysilane can also be selected from a group consisting of: methyl- and vinyl-, triethoxysilane, methyl- and N-beta-aminoethyl-gamma-aminopropyl trimethoxysilane.

In yet another embodiment of the present invention, a cyclic method of removing oil from oil-in-water emulsions is provided comprising providing a column of a filter media in accordance with the present invention, passing said oil-in-water emulsion downwardly through said column to provide an effluent stream and whereby oil is adsorbed on said media, monitoring the oil content of the effluent and when said oil content of said effluent stream exceeds a predetermined level, e.g., from about 15 ppm to about 30 ppm, backwashing said filter media with water for a time sufficient to desorb a substantial portion of the adsorbed oil from said media.

These and other objects of this invention will be better understood and will become more apparent with reference to the following detailed description considered in conjunction with the accompanying drawings.

DETAILED DESCRIPTION OF THE INVENTION

Figure 1:
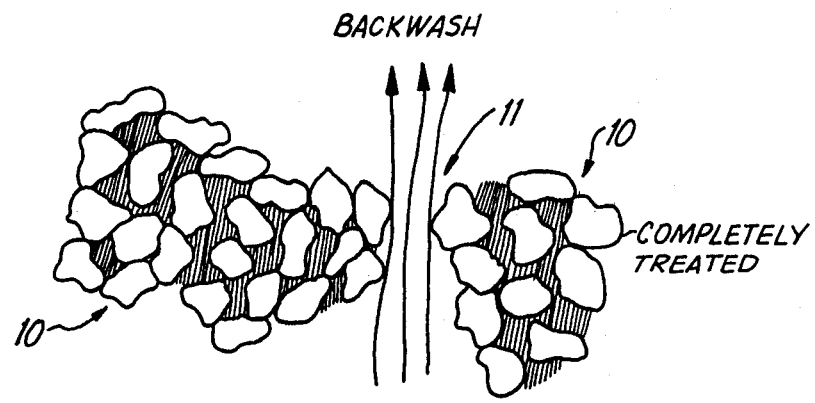
FIG. 1 is a schematic diagram of a congealed filter bed of fully treated glass granules.

Generally speaking, the invention relates to filter media for cleansing oil-in-water emulsions of their dispersed oil. The filter media of this invention are chemically treated granular glass or "filter sand." The granular material is first given a caustic wash with a solution containing from about 8% by weight to 12% by weight of aqueous base, preferably NaOH, in order to impart active hydroxyl groups on the substrate. These hydroxyl groups allow the material to easily form a siloxane bond with a trialkoxysilane. The trialkoxysilane chemically binds with the glass or sand material leaving a hydrocarbon group exposed on the surface of the granules, thus imparting adsorptive oil-wettability.

The pretreat caustic wash is preferably conducted at higher than ambient temperatures for several hours. In general, the caustic wash is conducted at temperatures in the range of from about 75° C. to about 90° C., for times ranging from about 1½ hours to about 3 hours. More than one wash may be found to be necessary to obtain a properly activated surface for siloxane bonding.

After treating the granular material with caustic, the material is washed with water and dried.

Next, the surface of the caustic treated granules is coated with approximately 3 to 3.5 grams of trialkoxysilane per liter of granules. In view of the relatively small volume of trialkoxysilane used relative to the volume of filter media, the trialkoxysilane preferably is dispersed in a liquid carrier. Typical liquid carriers include organic solvents such as alcohols which are readily evaporated at ambient pressure and temperatures generally below about 100° C. Indeed, approximately 10 ml of isopropyl alcohol per gram of trialkoxysilane is used. Thereafter, the liquid carrier is removed by evaporation and the trialkoxysilane coated granules heated at 150° C. for up to about 3 hours. For example, when the liquid carrier is isopropyl alcohol the coated granules are placed in a 75° C. to 90° C. oven until the isopropyl alcohol is completed evaporated. The temperature of the oven is then raised to 150° C. and held there for about 3 hours. The granules are then allowed to cool to ambient temperature.

When glass granules are treated with the trialkoxysilane, as described above, the resulting filter medium is observed to have poor backwashing characteristics.

This backwashing problem, and its solution, will be explained hereinafter, with reference to FIGS. 1-3.

The glass granules may be recycled glass of approximately 10 to 20 mesh (U.S. Standard Sieve Size). By 10 to 20 mesh is meant, of course, that the granules pass through 10 mesh but are retained by a 20 mesh sieve. Generally speaking, the glass granules are preferred to have a smooth surface, i.e., the granules should not be jagged or contain fissures. Smooth glass granules are preferred to prevent congealing of the granules in the filter bed.

Because oil removal is generally accomplished by adsorption of the oil upon the surfaces of the granules, the glass should be of a non-porous variety.

Sand of 10 to 20 and 20 to 30 mesh size (U.S. Standard Sieve) was also treated with the trialkoxysilane to provide a good filter medium. It was discovered, however, that not all types of sand provide a workable filter medium. Two types of sand were investigated: "filter sand" and "quartz sand."

"Quartz sand" is apparently a "loose" term. Such sand is used in casting among other specialty uses, and is sometimes higher in $Al_2O_3$. However, the "quartz sand" purchased from Rudd, Paterson, N.J. (sold as #18 Quartz) was actually whiter than the "filter sand" indicating it was higher in $SiO_2$. Rudd cited that it was 99.9% $SiO_2$ which is consistent with its appearance. However, the major difference in suitability is probably due to the fact that it is mechanically crushed to obtain the desired mesh size. This increases the surface area, creates fissures and is therefore physically different than uncrushed "filter sand." "Quartz sand" has poor backwashing characteristics. The poor backwashing of "quartz sand" could be due to the increased cohesiveness of the sand particles after they are oil wetted due to possible locking together of the "spines and fissures" of the sand particle surface.

"Filter sand" of 10 to 20 mesh and 20 to 30 (U.S. Standard Sieve Size) mesh was purchased from Jessie Morie Co., Mauricetown, N.J. The analysis of this sand by wt. % is as follows:

$SiO_2$—99.39
$Fe_2O_3$—0.24
$Al_2O_3$—0.19
$TiO_2$—0.12
$CaO$—0.01
$MgO$—0.004
Loss on Ignition—0.046

This sand is not crushed or mechanically worked in any way.

The "filter sand" or glass granules after caustic wash are preferably treated with a gamma-aminopropyl triethoxysilane, which can be purchased from Union Carbide, and which is sold with the designation A1100.

Other trialkoxysilanes can also be used to treat the granular materials and have been found to provide the "filter sand" in particular, with good oil retention capability even after backwashing, as shown below in Table I.

TABLE I

COMPARISON OF SILANE COUPLING AGENTS
OIL RETENTION ON TREATED FILTER SAND
AFTER SIMULATED OIL WATER CLARIFICATION
AND BACKWASHING

| UNION CARBIDE NUMBER | NOMENCLATURE | OIL RETENTION PPM OIL/GRAM SAND 10/20 MESH | OIL RETENTION PPM OIL/GRAM SAND 20/30 MESH |
|---|---|---|---|
| A-162 | Methyl triethoxysilane | 1330 | 3280 |
| A-163 | Methyl trimethoxysilane | 1370 | 2180 |
| A-151 | Vinyl triethoxysilane | 870 | 1600 |
| A-1120 | N—beta-aminoethyl gamma-aminopropyl trimethoxysilane | 1750 | 2240 |
| A-1100 | Gamma-aminopropyl triethoxysilane | 2770 | 2740 |
| Control | No Chemical | 68 | 57 |

Figure 4:
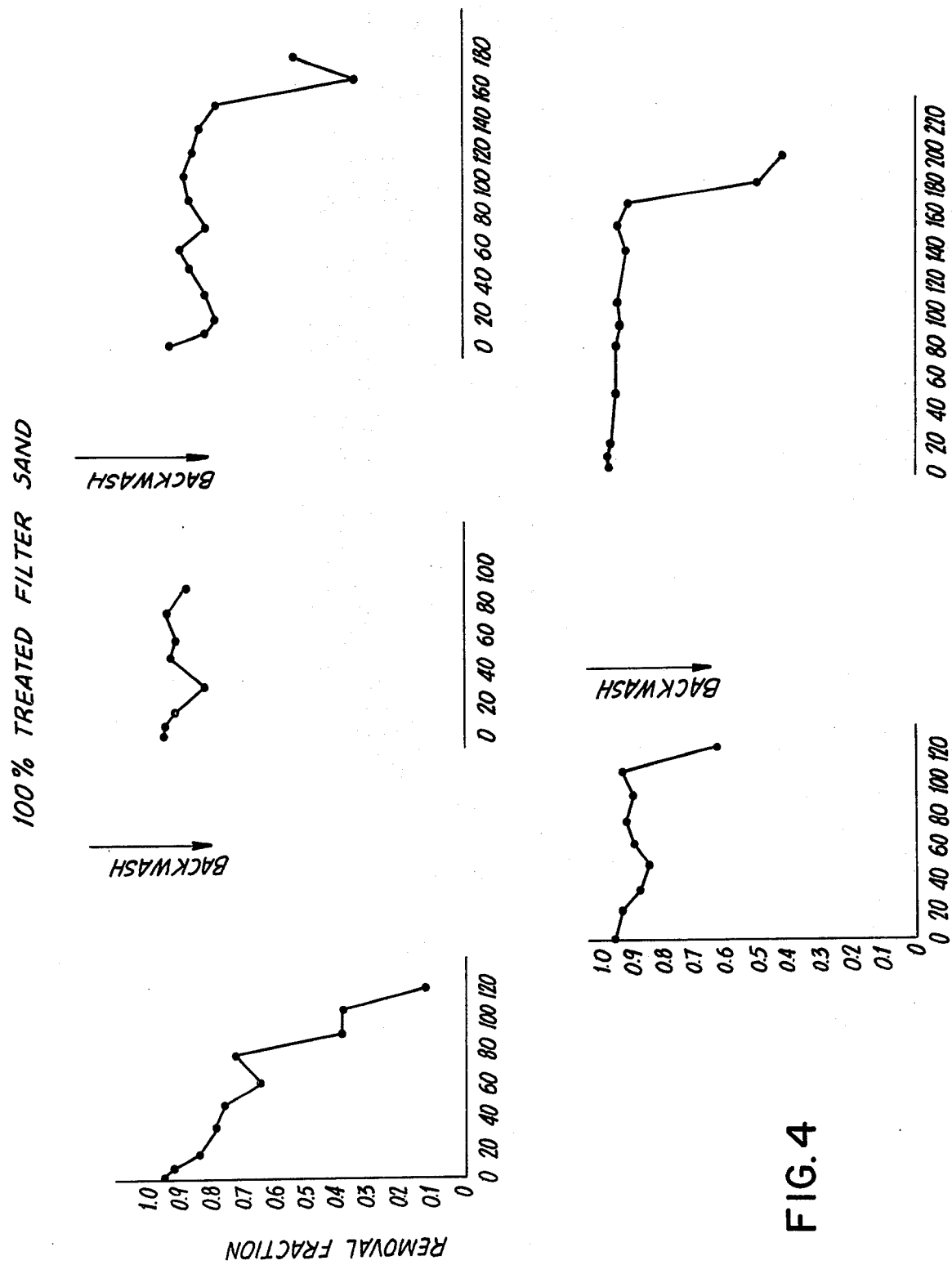
FIG. 4 is a graph of oil removal performance with respect to time (in minutes) of a filter bed containing fully treated filter sand.

Filter sand of 10 to 20 mesh size, treated with approximately 3 to 3.5 grams/liter of gamma-aminopropyl triethoxysilane gave consistently good oil removal performance. This was so, even after repeated backwashings of the filter bed, as shown in FIG. 4. Very good long term performance was noted even after four backwashes.

Figure 5:
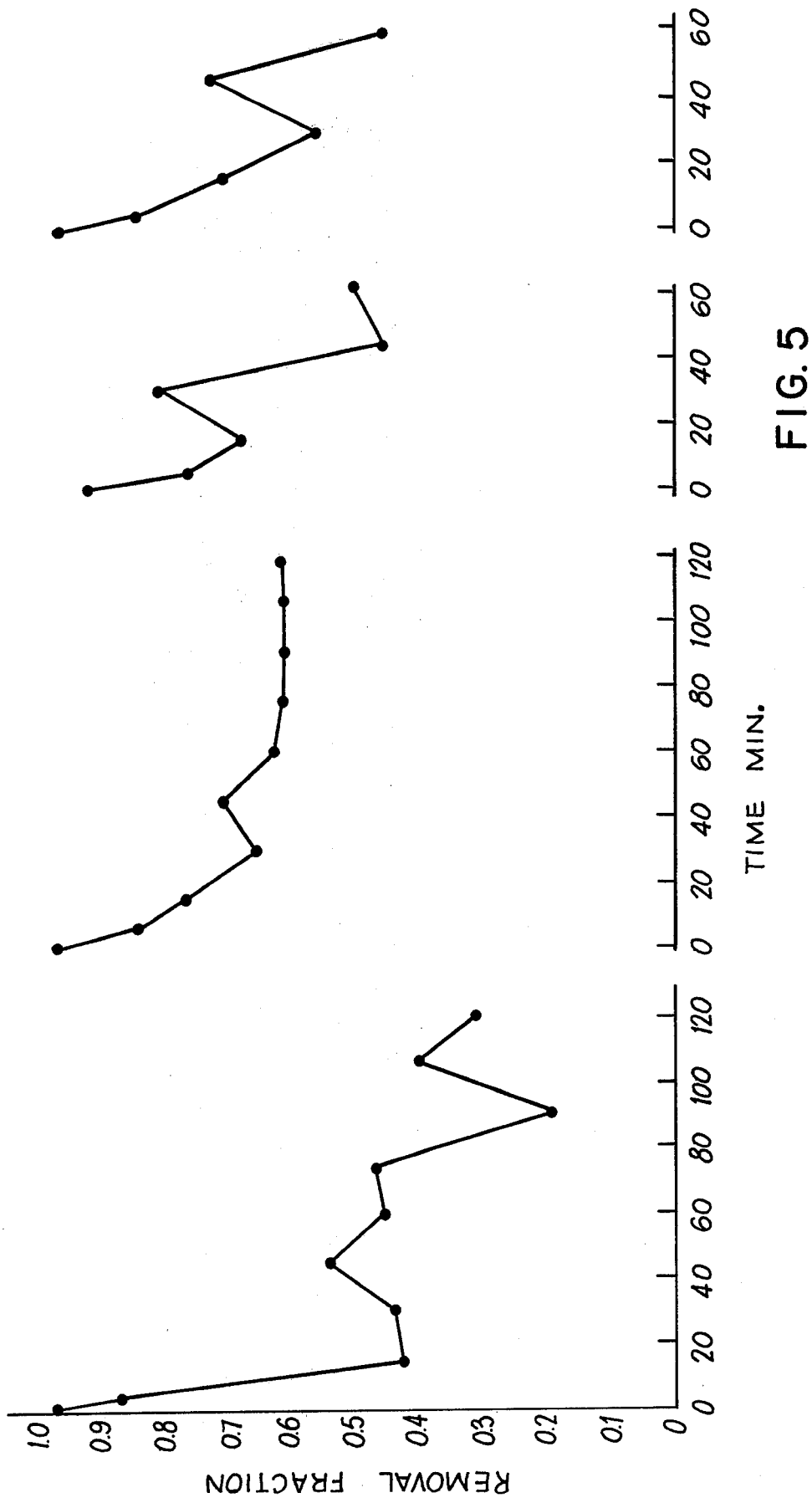
FIG. 5 is a graph of oil removal performance with respect to time (in minutes) of a filter bed of fully treated glass granules.

When recycled glass granules were similarly treated, however, the filter medium tended to congeal, i.e., the granules tended to clump together, as illustrated in the filter bed of FIG. 1. The congealed granules 10 are believed to result from the fact that the glass when treated with the aforementioned silane, becomes overly effective. That is to say, the glass granules become so oil-wettable that they tend to stick together. Such congealed granules provide a poor filter bed, because channels 11 are formed in the filter bed, thus deteriorating the ability of the filter bed to be cleansed. The effects of cleansing such a bed, via backwashing, is shown in FIG. 5.

Figure 2:
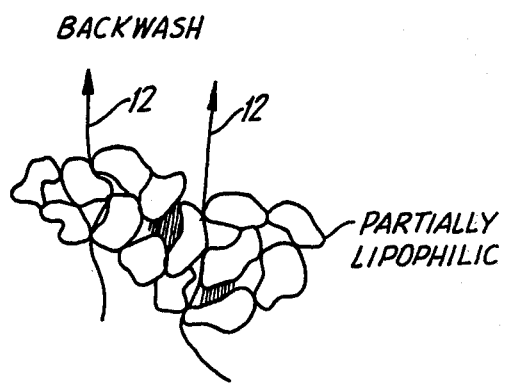
FIG. 2 is a schematic diagram of a partially treated filter bed of glass granules.
Figure 3:
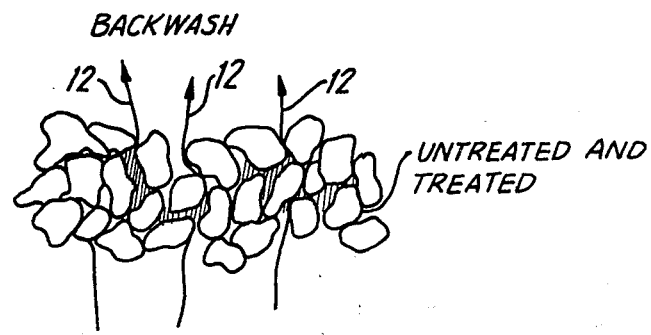
FIG. 3 is a schematic diagram of a filter bed containing a mixture of fully treated and untreated glass granules.

In order to resolve this problem, the glass granules were either treated with only 50% by weight of the silane (1.5 to 1.8 grams/liter), or the glass granules were fully treated, i.e., treated with 3 to 3.5 grams/liter of silane and then mixed with 50% by volume of untreated glass granules as depicted in the filter beds of FIGS. 2 and 3, respectively. The aforementioned treated glass granules allow the backwash to flow through the interstices of the beds, as shown by arrows 12. In this way, the beds can be effectively cleansed of their entrained oil and are thus reusable.

The mixed media bed of FIG. 3 consisting of a portion of treated granular media and a portion of untreated media prevents congealing of the bed since the oil wettable particles would be separated from one another by untreated particles.

The less lipophilic treated bed of FIG. 2 has some sites on the particles that are not oil wettable, and hence the congealing effect is reduced.

A summary of the performance of the "filter sand" and glass filter beds of this invention are outlined below in Table II. In the Table, the 100% treated material refers to material treated with 3 to 3.5 grams/liter of silane, and the 25% treated filter sand refers to material treated with from about 0.75 to 0.875 grams/liter of silane. The mixtures of treated and untreated material were made of approximately equal volume amounts of each, respectively.

TABLE II

SUMMARY OF GRANULAR MEDIA TESTS

| EXPERIMENT | SYSTEM | CONSECUTIVE RUNS | COMMENTS |
|---|---|---|---|
| 1 | 100% Treated Recycle Glass | 4 | Poor Backwash: Poor Performance |
| 2 | 100% Treated White (Quartz) Sand | 3 | Fair-Poor Performance |
| 3 | 100% Treated Filter Sand | 6 | Good Backwashing: Very Good Performance |
| 4 | 25% Treated Filter Sand | 3 | Fair Performance: Fairly Rapid Breakthrough |
| 5 | 100% Treated Filter Sand + Untreated Filter Sand | 6 | Equivalent to 100% Treat Filter Sand |
| 6 | Untreated Filter Sand | 2 | Decreasing Effectiveness |
| 7 | 100% Treated Recycle Glass + Untreated Recycle Glass | 3 | Fair Performance |
| 8 | 25% Treated Recycle Glass | 3 | Good Performance: Better than 100% Treat Glass |

To further illustrate the present invention, an oil-in-water emulsion was prepared as follows:

A glass column 48 inches high and 4 inches in diameter was charged with a volume of a filter media of approximately 5 liters resulting in a filter bed depth of 24 inches. The oily water influent to be clarified was prepared by introducing 30 ml/min of oil and 2540 ml/min of water to a mechanical mixer. The oily water stream was then introduced into the top of the filter bed and the effluent was removed via the bottom of the bed.

The oil used in this test was a relatively light oil, 99% #2 Diesel containing 1% Bunker C oil. The latter oil was used to provide some visual indication of the effectiveness of the test.

The clarified water effluent was analyzed by taking samples every 5 minutes or less. As long as the oil content of the clarified water effluent was 15 ppm or less, the oily water stream was fed into the bed. As soon as the water effluent showed greater than 15 ppm of oil, the bed was backwashed.

To backwash the bed, clean water was introduced into the bottom of the column to purge the retained oil from the granular filter bed. This reverse flow of backwash water was conducted at double the influent flow rate, or 5080 ml/min. For the initial 10 minutes, 4500 cc/min of air was also used with the backwash water to aid in the cleansing of the filter bed. For the final 4 minutes, only the water backwash was used.

After backwashing, the bed was again used for separating oil from water and after breakthrough, the bed regenerated by the backwashing procedure outlined above. This procedure was repeated many times with good results.

What is claimed is:

1. A backwashable filter medium comprising a non-porous substrate selected from the group consisting of granular glass which has been treated with caustic and from about 1.5 to 1.8 grams/liter of at least one trialkoxysilane, a mixture of about 50 volume percent granular glass and 50 volume percent granular glass which has been treated with caustic and from about 3 to 3.5 grams/liter of at least one trialkoxysilane, filter sand which has been treated with caustic and from about 3 to 3.5 grams/liter of at least one trialkoxysilane and a mixture of about 50 volume percent of filter sand and about 50 volume percent of said treated filter sand, said trialkoxysilane in all instances having from 1 to 2 carbon atoms in the alkoxy group.

2. A backwashable filter medium for cleansing oil-in-water emulsions of their dispersed oil, comprising a mixture of approximately 50 percent by weight of smooth-surfaced, non-porous, granular glass treated with caustic and then with approximately 3 to 3.5 grams/liter of at least one trialkoxysilane, wherein said alkoxy moiety has from 1 to 2 carbons; and approximately 50 percent by volume of non-treated smooth-surfaced, non-porous granular glass.

3. The backwashable medium of claim 2 wherein said trialkoxysilane is a gamma-aminopropyl triethoxysilane.

4. The backwashable medium of claim 3 wherein said granular glass has a mesh size approximately from 10 to 20.

5. The backwashable medium of claim 2 wherein said granular glass has a mesh size of approximately from 20 to 30.

6. The backwashable medium of claim 2 wherein said trialkoxysilane is selected from a group consisting of at least one of: methyl-, vinyl-, gamma-aminopropyl-, triethoxysilane; methyl- and N-beta-aminoethyl gamma-aminopropyl-, trimethoxysilane.

7. A backwashable filter medium for cleansing oil-in-water emulsions of their dispersed oil, comprising smooth-surfaced, non-porous, granular filter sand treated with caustic and then with approximately 3 to 3.5 grams/liter of at least one trialkoxysilane wherein said alkoxy moiety has from 1 to 2 carbons.

8. The backwashable medium of claim 7 wherein said trialkoxysilane is a gamma-aminopropyl triethoxysilane.

9. The backwashable medium of claim 7 wherein said granular filter sand has a mesh size of approximately from 10 to 20.

10. The backwashable medium of claim 7 wherein said granular filter sand has a mesh size of approximately from 20 to 30.

11. The backwashable medium of claim 7 wherein said trialkoxysilane is selected from a group consisting of at least one of: methyl-, vinyl-, gamma-aminopropyl-, triethoxysilane; methyl- and N-beta-aminoethyl-gamma-aminopropyl-, trimethoxysilane.

12. A backwashable filter medium for cleansing oil-in-water emulsions of their dispersed oil, comprising smooth-surfaced, non-porous, granular glass treated with caustic and then with approximately 1.5 to 1.8 grams/liter of at least one trialkoxysilane wherein said alkoxy moiety has from 1 to 2 carbons.

13. The backwashable medium of claim 12 wherein said trialkoxysilane comprises a gamma-aminopropyl triethoxysilane.

14. The backwashable medium of claim 12 wherein said granular glass has a mesh size of approximately from 10 to 20.

15. The backwashable medium of claim 12 wherein said granular glass has a mesh size of approximately from 20 to 30.

16. The backwashable medium of claim 12 wherein said trialkoxysilane is selected from a group consisting of at least one of: methyl-, vinyl-, gamma-aminopropyl-, triethoxysilane; methyl- and N-beta-aminoethyl-gamma-amino-propyl-, trimethoxysilane.

17. A method of preparing a backwashable filter medium for cleansing oil-in-water emulsions comprising:
washing a smooth-surfaced, non-porous substrate selected from the group consisting of granular glass and filter sand with from about 8 to about 12 weight percent aqueous base at temperatures above ambient temperature;
drying said base treated substrate;
mixing said substrate then with an alkoxysilane having 1 to 2 carbon atoms in the alkoxy group; and
heating said substrate and silane at about 150° C. for about 3 hrs., whereby a coated substrate is obtained when said substrate is glass, mixing said alkoxysilane in an amount selected from (a) 1.5 to 1.8 grams/liter, and (b) 3.0 to 3.5 grams/liter, and when the amount of alkoxysilane is selected from (b) mixing equal parts by volume of granular glass with said coated substrate, and when said substrate is filter sand mixing said alkoxysilane in an amount ranging from about 3.0 to 3.5 grams/liter.

18. The method of claim 17 wherein said washing is conducted at from about 75° C. to about 80° C. for from about 1½ hrs. to about 3 hrs.

19. In a cyclic process for cleansing oil-in-water emulsions of their dispersed oil wherein said emulsion is passed through a bed of filter media for adsorbing the oil and providing an effluent stream and backwashing said bed when the amount of oil in said effluent stream exceeds a predetermined minimum amount, the improvement comprising charging said bed with a filter medium selected from the group consisting of granular glass which has been treated with caustic and from about 1.5 to 1.8 grams/liter of at least one trialkoxysilane, a mixture of about 50 volume percent granular glass and 50 volume percent granular glass which has been treated with caustic and from about 3 to 3.5 grams/liter of at least one trialkoxysilane, filter sand which has been treated with caustic and from about 3 to 3.5 grams/liter of at least one trialkoxysilane and a mixture of about 50 volume percent of filter sand and about 50 volume percent of said treated filter sand, said trialkoxysilane in all instances having from 1 to 2 carbon atoms in the alkoxy group.

20. A method of removing oil from an oil-in-water emulsion comprising the steps of:
(1) providing a column of filter medium selected from the group consisting of granular glass which has been treated with caustic and from about 1.5 to 1.8 grams/liter of at least one trialkoxysilane, a mixture of about 50 volume percent granular glass and 50 volume percent granular glass which has been treated with caustic and from about 3 to 3.5 grams/liter of at least one trialkoxysilane, filter sand which has been treated with caustic and from about 3 to 3.5 grams/liter of at least one trialkoxysilane and a mixture of about 50 volume percent of filter sand and about 50 volume percent of said treated filter sand, said trialkoxysilane in all instances having from 1 to 2 carbon atoms in the alkoxy group;

(2) passing said oil-in-water emulsion downwardly through said column whereby oil is adsorbed on said media and and effluent stream is obtained;
(3) monitoring the oil content of said effluent stream and when said oil content exceeds a predetermined level;
(4) backwashing said filter media for a time sufficient to desorb a substantial portion of the adsorbed oil from said media.

21. The method of claim 20 wherein said steps are repeated cyclically.

22. The method of claim 21 wherein said filter media is filter sand which has been treated with about 3 to about 3.5 grams/liter of alkoxysilane.